US006978385B1

(12) United States Patent
Cheston et al.

(10) Patent No.: US 6,978,385 B1
(45) Date of Patent: Dec. 20, 2005

(54) DATA PROCESSING SYSTEM AND METHOD FOR REMOTE RECOVERY OF A PRIMARY PASSWORD

(75) Inventors: Richard W. Cheston, Morrisville, NC (US); Daryl Carvis Cromer, Apex, NC (US); Richard Alan Dayan, Wake Forest, NC (US); Dhruv Manmohandas Desai, Cary, NC (US); Jan M. Janick, Morrisville, NC (US); Howard Jeffery Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,430

(22) Filed: Mar. 1, 2000

(51) Int. Cl.[7] .............................. H04L 9/32; G06F 9/445
(52) U.S. Cl. ............................ 713/202; 713/2; 340/5.85
(58) Field of Search ................................ 713/1, 2, 100, 713/182–185, 200–202; 709/204, 206; 705/50, 64, 65, 67, 72; 340/5.1, 5.2, 5.51, 5.54, 5.8, 5.81, 5.85, 825

(56) References Cited

U.S. PATENT DOCUMENTS

| | | | |
|---|---|---|---|
| 5,091,939 A | 2/1992 | Cole et al. | 380/25 |
| 5,226,080 A | 7/1993 | Cole et al. | 380/25 |
| 5,425,102 A | 6/1995 | Moy | 380/25 |
| 5,485,622 A | 1/1996 | Yamaki | 395/186 |
| 5,708,777 A * | 1/1998 | Sloan et al. | 713/202 |
| 5,745,573 A | 4/1998 | Lipner et al. | 380/21 |
| 5,892,906 A | 4/1999 | Chou et al. | 395/188.01 |
| 5,966,705 A * | 10/1999 | Koneru et al. | 707/9 |
| 6,026,491 A * | 2/2000 | Hiles | 713/202 |
| 6,067,625 A * | 5/2000 | Ryu | 713/202 |
| 6,161,178 A * | 12/2000 | Cromer et al. | 713/2 |
| 6,161,185 A * | 12/2000 | Guthrie et al. | 713/201 |
| 6,243,813 B1 * | 6/2001 | Kong | 713/193 |
| 6,360,322 B1 * | 3/2002 | Grawrock | 713/176 |
| 6,647,498 B1 * | 11/2003 | Cho | 713/202 |
| 6,725,382 B1 * | 4/2004 | Thompson et al. | 713/202 |
| 2002/0004749 A1 * | 1/2002 | Froseth et al. | 705/16 |
| 2002/0026353 A1 * | 2/2002 | Porat et al. | 705/14 |
| 2002/0032573 A1 * | 3/2002 | Williams et al. | 705/1 |
| 2002/0040346 A1 * | 4/2002 | Kwan | 705/51 |
| 2003/0065954 A1 * | 4/2003 | O'Neill et al. | 713/202 |
| 2004/0210518 A1 * | 10/2004 | Tiem | 705/39 |

FOREIGN PATENT DOCUMENTS

| | | |
|---|---|---|
| JP | 02-288973 | 11/1990 |
| JP | 05-173972 | 7/1993 |
| JP | 08-147062 | 6/1996 |
| JP | 10-177551 | 6/1998 |
| JP | 10-187618 | 7/1998 |
| JP | 11-212922 | 8/1999 |

OTHER PUBLICATIONS

"Norton Password Manager 2004" 2005, product literature, pp 1–2.*
Held, "Password Recovery Windows Toolkit", 1998, International Journal of Network Management, John Wiley & Sons, Ltd, pp 368–370.*

* cited by examiner

Primary Examiner—Christopher Revak
(74) Attorney, Agent, or Firm—George E. Grosser; Carlos Munoz-Bustamante; Dillon & Yudell LLP (57) ABSTRACT

A data processing system and method are disclosed for remotely recovering a client computer system's primary password. The primary password be correctly entered prior to the client computer system becoming fully accessible to a user. The client computer system is coupled to a server computer system utilizing a network. Prior to the client computer system completing a boot process, a user is prompted to enter the primary password. An interrogative password method is provided in response to an incorrect entry of the primary password. The primary password is recoverable in response to a successful execution of the interrogative password method. The primary password is recoverable from the server computer system by the client computer system prior to said client computer system completing said boot process utilizing the interrogative password method.

21 Claims, 8 Drawing Sheets

DATA PROCESSING SYSTEM AND METHOD FOR REMOTE RECOVERY OF A PRIMARY PASSWORD

BACKGROUND OF THE INVENTION

1. Technical Field

The present invention relates in general to data processing systems and, in particular, to a data processing system and method providing for remotely recovering a primary password required to complete a boot process of a client computer system. Still more particularly, the present invention relates to a data processing system and method for remotely recovering a primary password required to complete a boot process of a client computer system in response to a successful execution of an interrogative password method.

2. Description of the Related Art

Personal computer systems are well known in the art. They have attained widespread use for providing computer power to many segments of today'modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM'PC 300 series, Aptiva series, and Intellistation series.

A computer system requires a basic input/output system (BIOS) in order to operate. The BIOS is code that controls basic hardware operations, such as interactions with disk drives, hard drives, and the keyboard.

When a computer is reset, a boot process begins when POST begins executing. POST uses the initialization settings to configure the computer. BIOS then controls the basic operation of the hardware utilizing the hardware as it was configured by POST. The boot process is complete upon the completion of the execution of the POST commands.

In known systems, after the system has completed its boot process, a password is sometimes used to restrict the use of the system. After the system has been initialized, a user is prompted to enter the correct password. If the correct password is entered, the system will permit access by the user and boot the operating system. If an incorrect password is entered, the system will prohibit access.

One of the largest cost problems today for a large corporate information technology (IT) organization is passwords lost by users. When a user has forgotten their password, the user must call the IT help desk and get a new password. Alternatively, a service technician from the IT department may have to physically go to the user'computer system and reset the system so that the user may enter a new password.

Therefore a need exists for a data processing system and method for recovering a client computer system's primary password from a server computer system prior to the client computer system completing a boot process.

SUMMARY OF THE INVENTION

A data processing system and method are disclosed for remotely recovering a client computer system'primary password. The primary password must be correctly entered prior to the client computer system becoming fully accessible to a user. The client computer system is coupled to a server computer system utilizing a network. Prior to the client computer system completing a boot process, a user is prompted to enter the primary password. An interrogative password method is provided in response to an incorrect entry of the primary password. The primary password is recoverable in response to a successful execution of the interrogative password method. The primary password is recoverable from the server computer system by the client computer system prior to the client computer system completing the boot process utilizing the interrogative password method.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for remotely recovering a client computer system's primary password. The client computer system is coupled to a server computer system utilizing a network.

A primary password is established for a client computer system by a user. The primary password must be correctly entered during a boot process of the client in order for the client to complete its boot. If the primary password is not correctly entered, the client will be unable to complete booting, and access to the client will be prohibited.

An alternative password method is described and may be invoked upon an inability to correctly enter the primary password. The alternative password method is an interrogative method which is executed during the client's boot process, and prior to the completion of the boot process. The interrogative method is utilized by a user when the user has been unable to supply the correct primary password. If the interrogative method is executed correctly, the primary password will be supplied remotely by the server.

The interrogative password method includes prompting a user for the answer to a challenge question. If the challenge question is answered correctly, the interrogative method is executed correctly, and the server will supply the primary password. The client will then complete its boot process.

The question and expected answer the client utilizes during the interrogative method are originally supplied by a user. The question and answer are then transmitted by the client to the server along with a client identifier which identifies the particular client supplying the question and answer. The server then stores the question and answer along with the client identifier to associate the question and answer with this client.

When a client is executing a boot process, if the primary password is not entered correctly, the client will transmit a request to the server for the client's question and answer pair. The server then transmits the question to the client, which then prompts the user for the answer by displaying the question. Once an answer is entered, the client then transmits the answer to the server. The server will compare the received answer with the expected answer. If they are the same, the server will transmit the client's primary password to the client. The client will then be able to complete its boot process.

Transmissions between the client and server are encrypted utilizing an encryption device which includes secure storage. Utilizing the encryption device, the client will encrypt its transmissions with the client's private key and the server's public key. The server will then decrypt the transmissions received from the client with the client's public key and the server's private key. Likewise, the server will encrypt its transmissions to the client with the server's private key and the client's public key. The client will then decrypt the transmissions received from the server with the server's public key and the client's private key.

Figure 1:
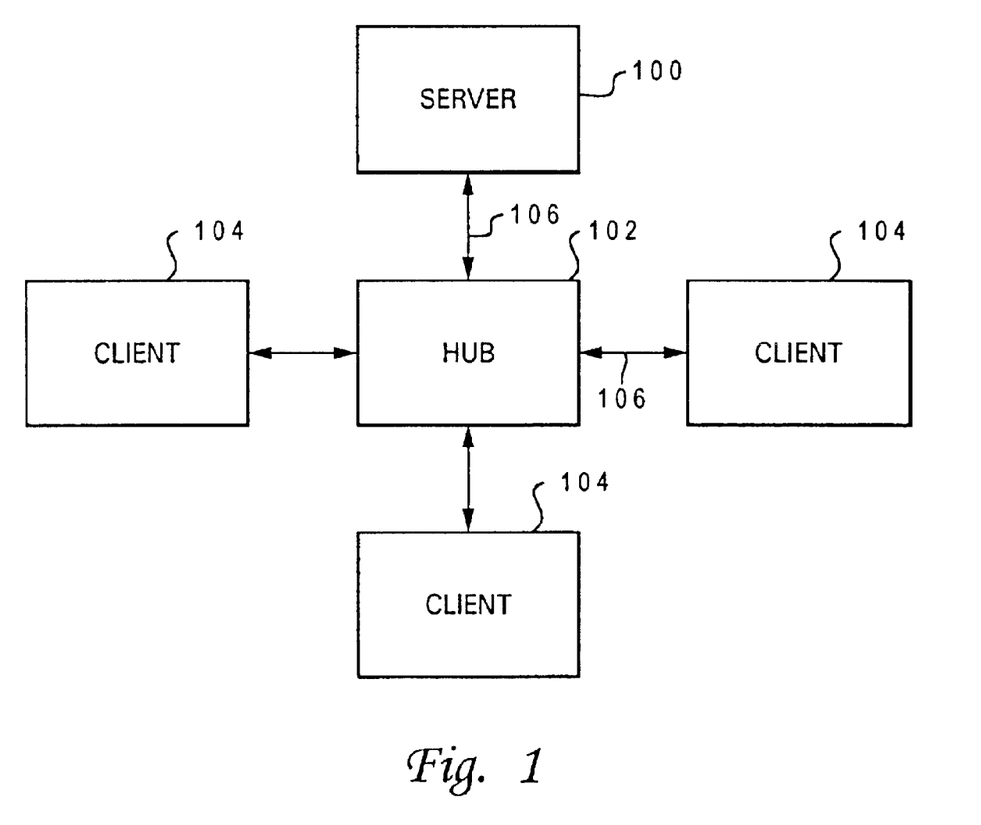
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a network including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client computer systems 104 also connect to hub 102 through respective LAN busses 106. The preferred form of the network conforms to the Ethernet specification and uses such hubs and busses. It will be appreciated, however, that other forms of networks may be utilized to implement the invention.

Figure 2A:
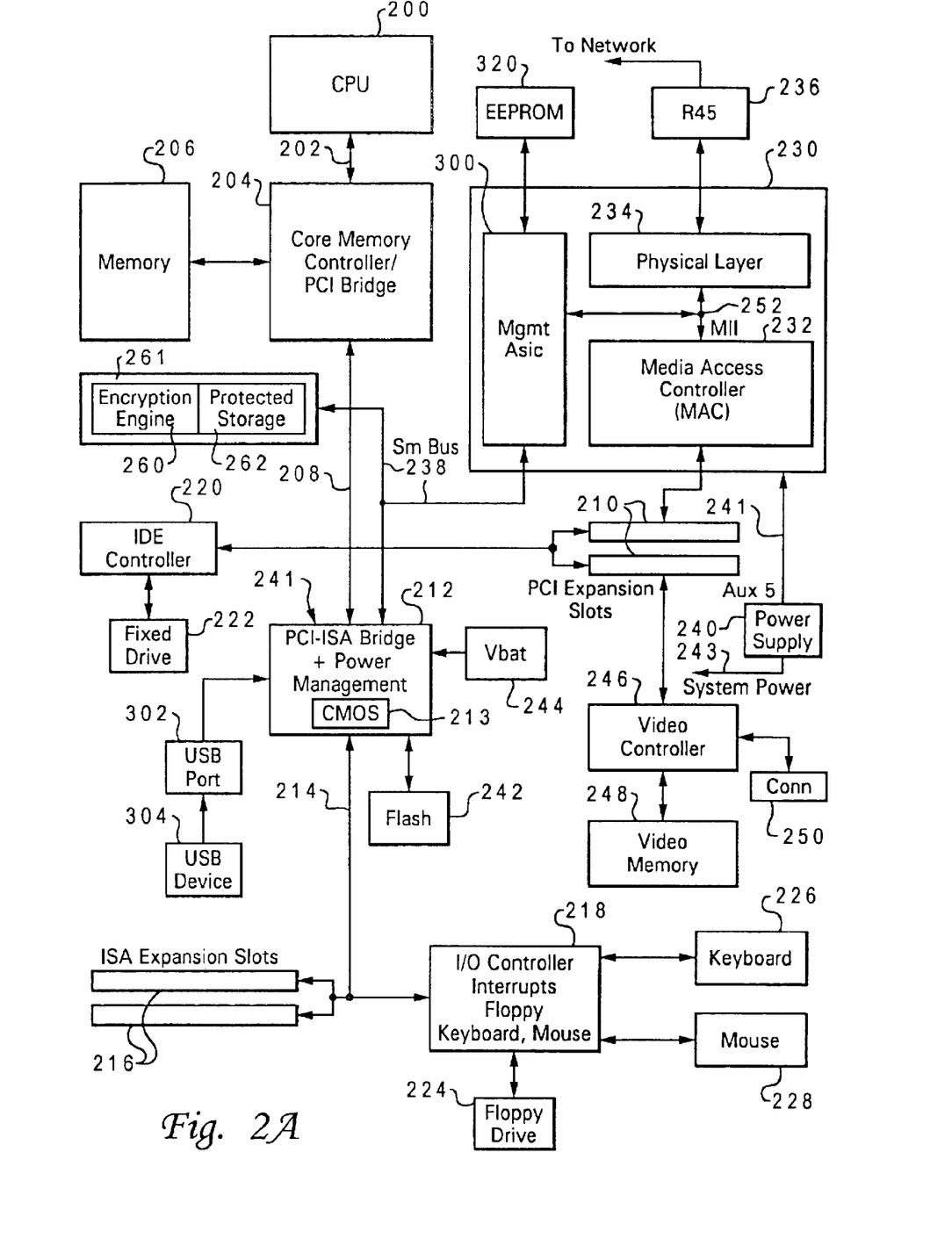
FIG. 2A depicts a more detailed pictorial representation of a client computer system in accordance with the method and system of the present invention.

FIG. 2A depicts a more detailed pictorial representation of a client computer system in accordance with the method and system of the present invention. Client computer system 104 includes a planar (also commonly called a motherboard or system board) which is mounted within client 104 and provides a means for mounting and electrically interconnecting various components of client 104 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 206 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Client computer system 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104 through connector 250.

Computer system 104 includes a power supply 240 which supplies full normal system power 243, and has an auxiliary power main AUX 5 241 which supplies full time power to the power management logic 212.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public\private key encryption. Engine 260 may access a protected storage device 262. Protected storage device 262 is accessible only through engine 260. Storage device 262 cannot be read or written to by the CPU, device 222, or any other device in the system. The client's unique identifier and its encryption key pair are stored within storage 262. Everything stored in storage 262 is protected by engine 260 and is not directly accessible to the planar or its components. Device 262 may be implemented utilizing an electronically erasable storage device, such as an EEPROM. Access may be gained to non-readable storage device 262 in order to initially store the client private key. However, after the client private key is stored, it cannot be read. The keys stored in EEPROM 262 may not be read by any component of the planar other than engine 260.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. Examples of such an encryption scheme are an RSA key pair system, and a secure sockets layer (SSL) system.

In accordance with the present invention, encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Client 104 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit client 104 to communicate with server 100 utilizing a communication link 106.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236. Physical layer 234 is also responsible for wave shaping and provides analog voltages. In a preferred embodiment, physical layer 234 is implemented utilizing an Integrated Services chip ICS-1890.

Physical layer 234 includes auto-negotiation logic that serves three primary purposes. First, it determines the capabilities of client 104. Second, it advertises its own capabilities to server 100. And, third, it establishes a connection with server 100 using the highest performance connection technology.

Figure 2B:
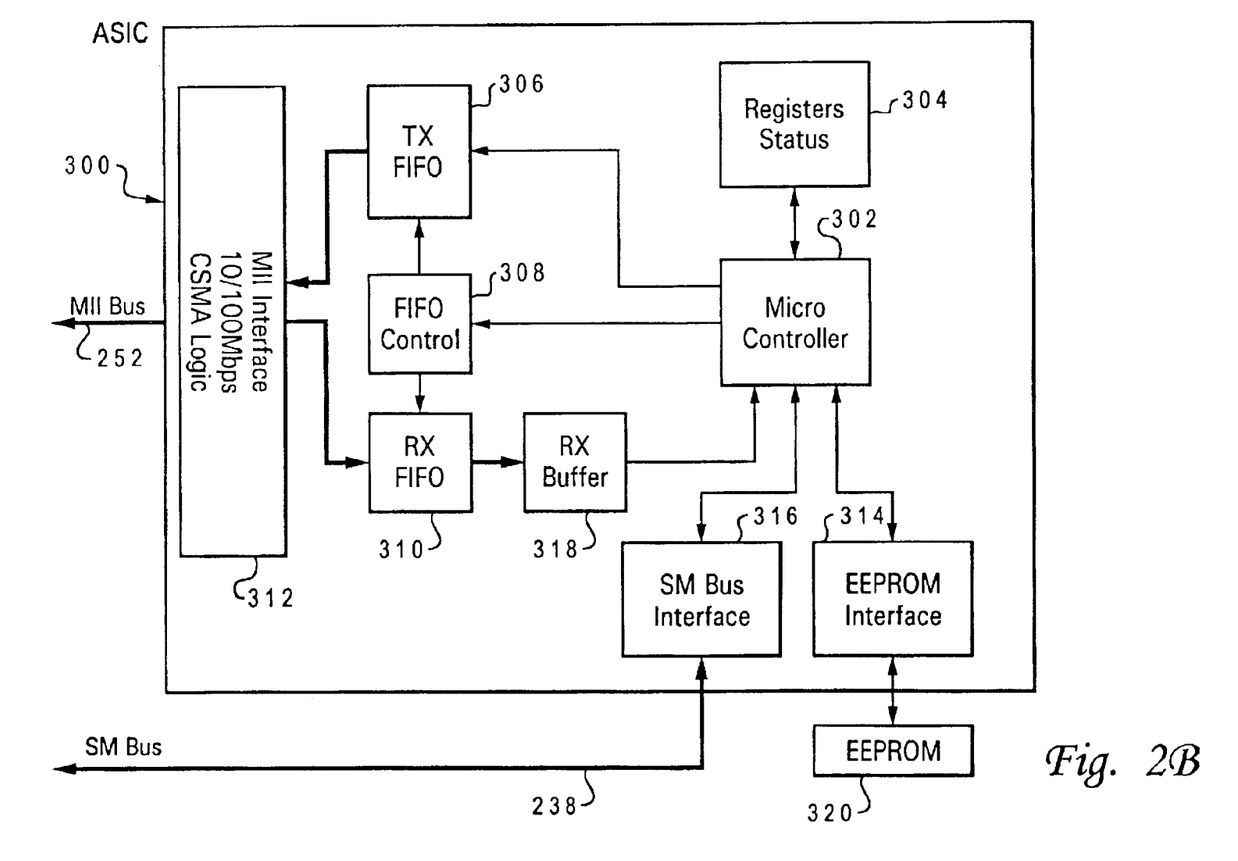
FIG. 2B illustrates a pictorial representation of a special purpose processing unit which is included within a network adapter included within a client computer system in accordance with the method and system of the present invention.

FIG. 2B illustrates a pictorial representation of special purpose processing unit 300 which is included within a network adapter 230 included within a client computer system 104 in accordance with the method and system of the present invention. Special purpose processing unit is preferably implemented utilizing an ASIC 300 which includes a micro-controller 302 which includes several state machines to handle the following tasks: packet reception, SM bus interface, and BEPROM updates. Micro-controller 302 sends commands to FIFO control 308 to control data flow from TX FIFO 306, RX FIFO 310, and RX Buffer 318. Micrb-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID).

Figure 3:
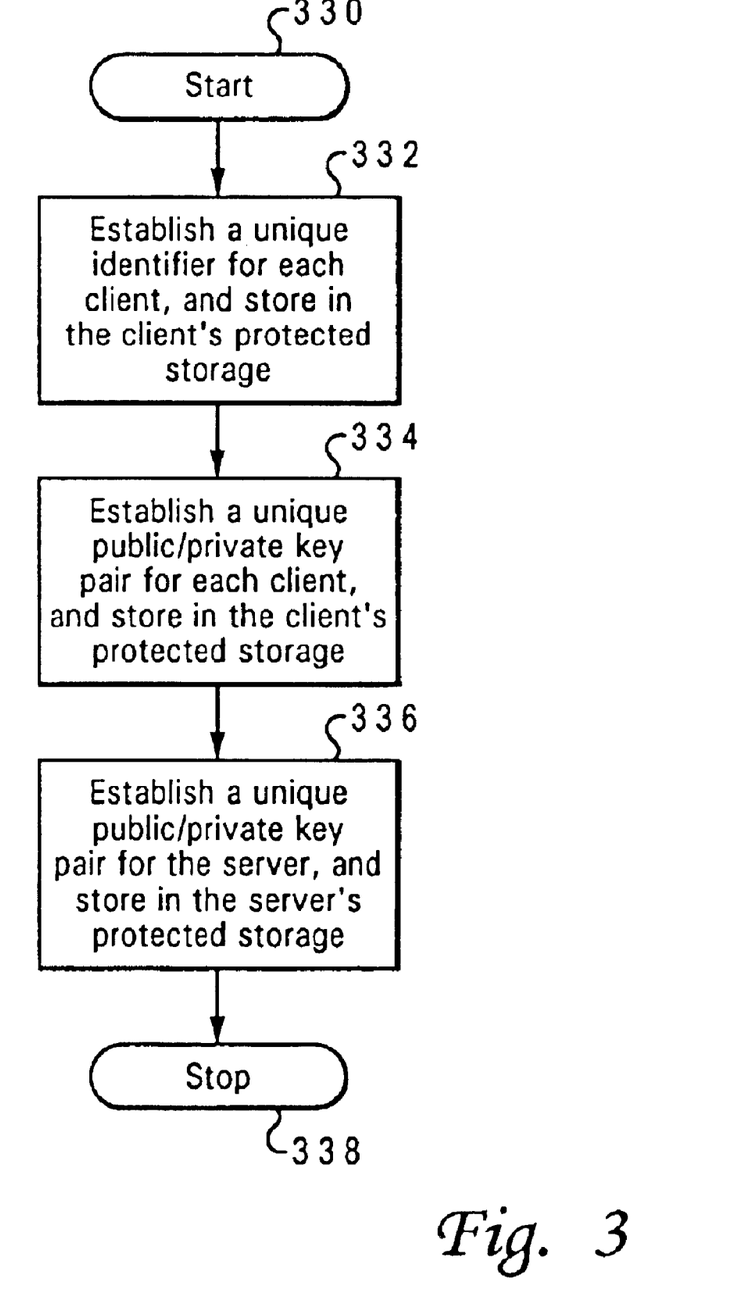
FIG. 3 illustrates a high level flow chart which depicts establishing a unique identifier for each client, and establishing encryption keys for the server and client computer systems in accordance with the method and system of the present invention.

FIG. 3 illustrates a high level flow chart which depicts establishing a unique identifier for each client, and establishing encryption keys for the server and client computer systems in accordance with the method and system of the present invention. The process starts as depicted at block 330 and thereafter passes to block 332 which illustrates establishing a unique identifier for each client which uniquely identifies the particular client computer system. The unique identifier is stored in protected storage 262 in the client which is identified by the unique identifier. Next, block 334 depicts establishing a unique encryption key pair, including a public and private key, for each client. The unique key pair is stored in the client in the protected storage 262. Thereafter, block 336 illustrates establishing a unique encryption key pair for the server computer system. The unique key pair for the server is stored in the server in protected storage. The process then terminates as illustrated at block 338.

Figure 4:
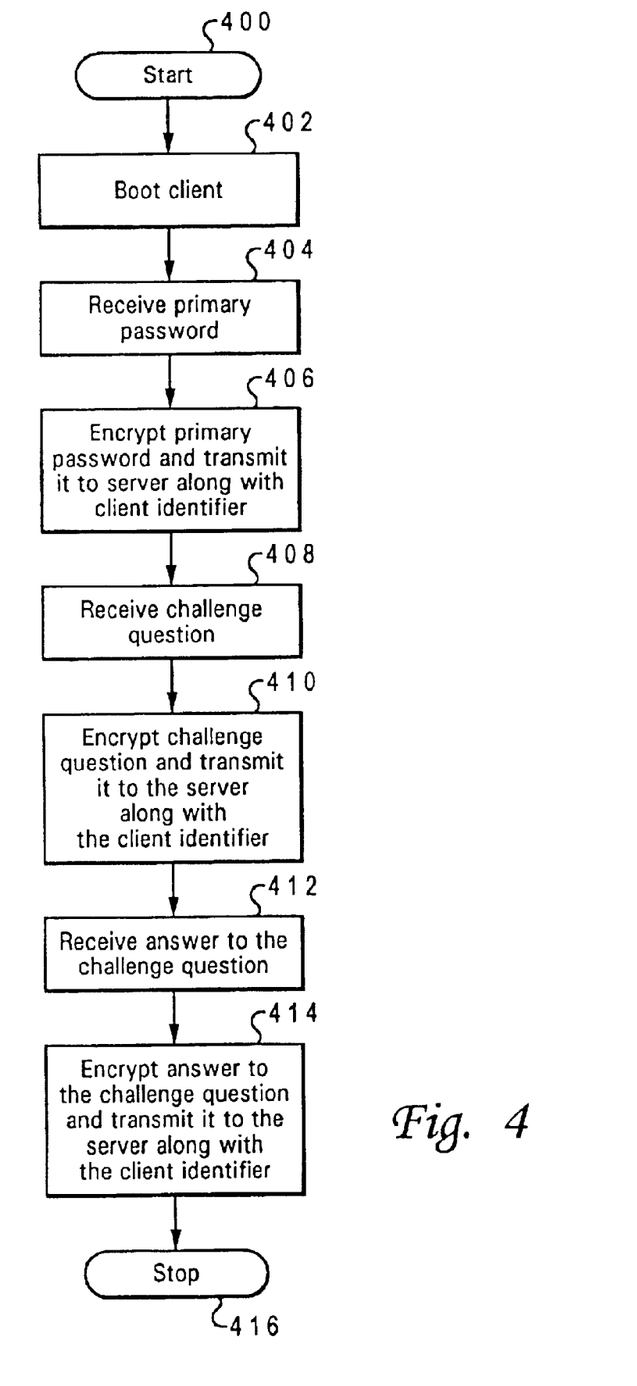
FIG. 4 depicts a high level flow chart which illustrates a client computer system receiving a primary password and a question and answer combination for an interrogative password method in accordance with the method and system of the present invention.

FIG. 4 depicts a high level flow chart which illustrates a client computer system receiving a primary password and a question and answer combination for an interrogative password method in accordance with the method and system of the present invention. The process starts as depicted at block 400 and thereafter passes to block 402 which illustrates booting the client computer system. Next, block 404 depicts the client initially receiving a primary password. This primary password will be required during subsequent boot processes in order to gain access to the client. Thereafter, block 406 illustrates the client encrypting the password with the client's private key and server's public key, and transmitting the encrypted password to the server. The process then passes to block 408 which depicts the client receiving a question for an interrogative password method. Block 410, then, depicts the client encrypting the interrogative method question with the client's private and server's public keys, and transmitting the encrypted question to the server along with the client's unique identifier. Thereafter, block 412 illustrates the client receiving a correct answer for the interrogative method which will be associated with the question. Next, block 414 depicts the client encrypting the correct answer with the client's private key and server's public key, and transmitting the encrypted answer to the server along with the client identifier. The process then terminates as illustrated at block 416.

Figure 5:
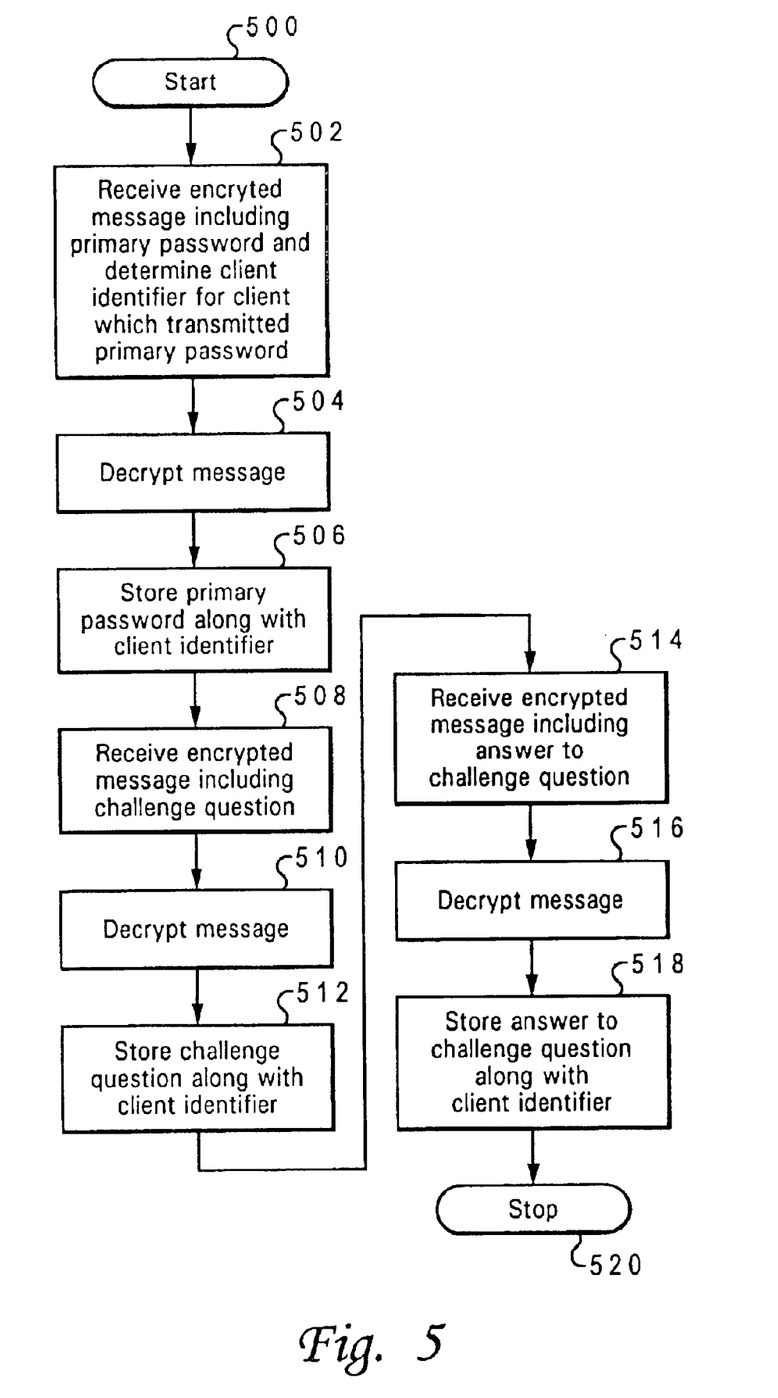
FIG. 5 illustrates a high level flow chart which depicts a server computer system storing a primary password and a question and answer combination for an interrogative password method associated with a particular client computer system in accordance with the method and system of the present invention.

FIG. 5 illustrates a high level flow chart which depicts a server computer system storing a primary password and a question and answer combination for an interrogative password method associated with a particular client computer system in accordance with the method and system of the present invention. The process starts as illustrated at block 500 and thereafter passes to block 502 which depicts the server receiving an encrypted primary password from a client computer system, and determining a client identifier which identifies the client which transmitted the encrypted primary password. Next, block 504 illustrates the server decrypting the primary password utilizing the server's private key and client's public key. Thereafter, block 506 depicts the server storing the decrypted primary password along with the client identifier. The process then passes to block 508 which illustrates the server receiving a message including an encrypted interrogative question.

Block 510, then, depicts the server decrypting the question with the server's private and client's public keys. Thereafter, block 512 illustrates the server storing the decrypted question along with the client identifier. Next, block 514 depicts the server receiving a message including an encrypted correct answer to the question. Thereafter, block 516 depicts the server decrypting the correct answer with the server's private key and client's public key. The process then passes to block 518 which illustrates the server storing the decrypted correct answer to the question with the client identifier and associating the response with the stored question. The process then terminates as illustrated at block 520.

Figure 6:
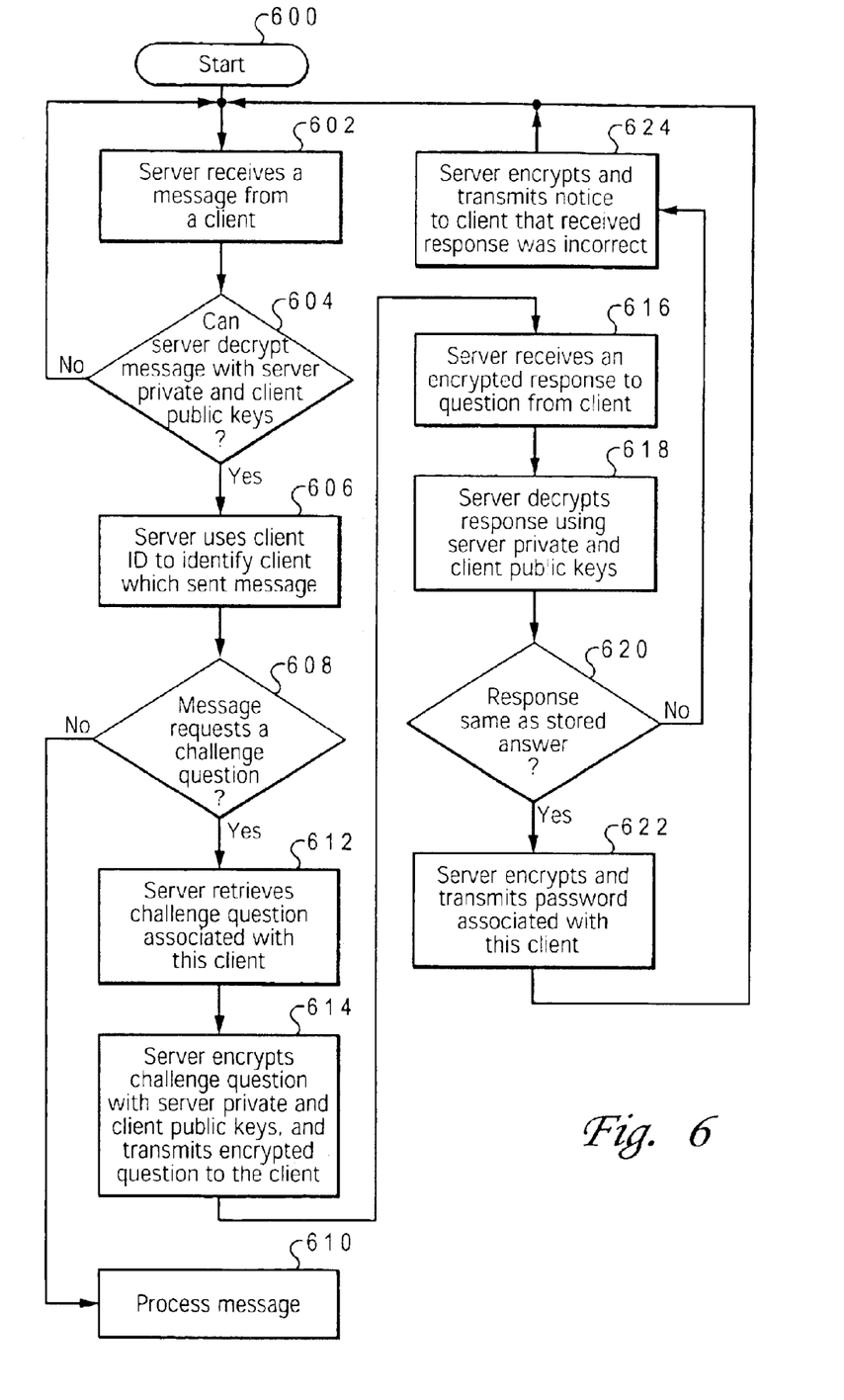
FIG. 6 depicts a high level flow chart which illustrates a server computer system remotely providing a primary password in response to an interrogative password method for a particular client in accordance with the method and system of the present invention.

FIG. 6 depicts a high level flow chart which illustrates a server computer system remotely providing a primary password in response to an interrogative password method for a particular client in accordance with the method and system of the present invention. The process starts as depicted at block 600 and thereafter passes to block 602 which illustrates the server receiving a decrypted message from one of the clients 104. The process then passes to block 604 which depicts a determination of whether or not the server was capable of decrypting the message. If a determination is made that the server was not capable of decrypting the received message, the process passes back to block 602. Referring again to block 604, if a determination is made that the server was capable of decrypting the message, the process passes to block 606 which illustrates the server utilizing the client identifier (ID) which was included within the decrypted message to identify which client sent the message. The process then passes to block 608 which depicts a determination of whether or not the message includes a request for a challenge question. If a determination is made that the message does not include a request for a challenge question, the process passes to block 610 which illustrates processing the message normally.

Referring again to block 608, if a determination is made that the message does include a request for a challenge question, the process passes to block 612 which illustrates the server retrieving a challenge question associated with the client which sent the message. Next, block 614 depicts the server encrypting the challenge question with the server private and client public keys. The encrypted question is then transmitted to the client. The process then passes to block 616 which illustrates the server receiving an encrypted response to the question from the client. Next, block 618 depicts the server decrypting the response using the server private and client public keys. Thereafter, the process passes to block 620 which illustrates a determination of whether or not the response received from the client is the same as the answer stored in the server and associated with this client. If a determination is made that the received response is the same as the stored answer, the process passes to block 622 which depicts the server encrypting and transmitting the primary password stored in the server and associated with this client to the client. The process then passes back to block 602. Referring again to block 620, if a determination is made that the received response and answer stored and associated with this client are different, the process passes to block 624 which illustrates the server encrypting and transmitting a notice to the client that the received response was incorrect. The process then passes back to block 602.

Figure 7:
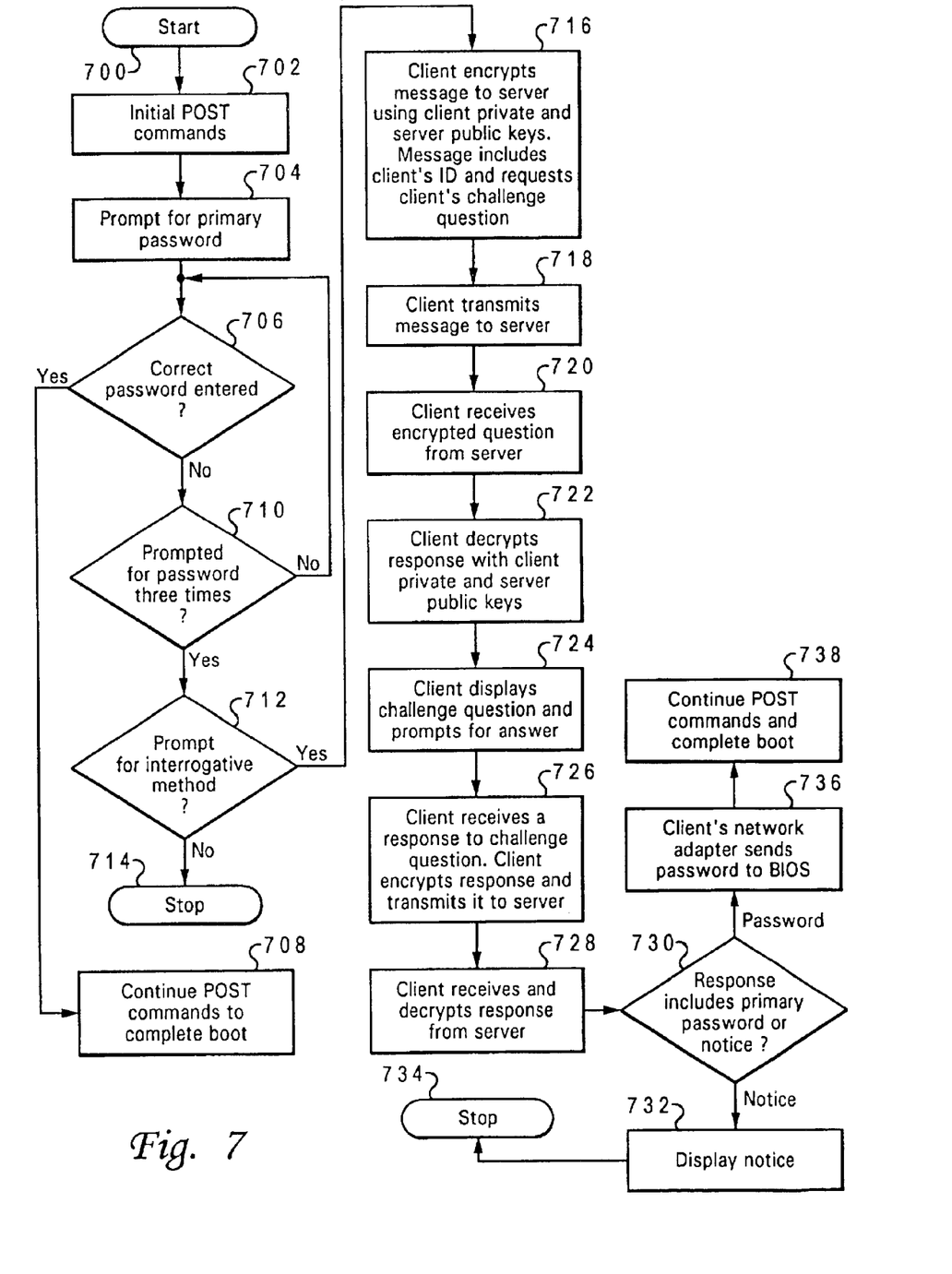
FIG. 7 illustrates a high level flow chart which depicts a client computer system permitting a user to access the client in response to a receipt of a primary password from a server computer system in response to a successful execution of an interrogative password method in accordance with the method and system of the present invention.

FIG. 7 illustrates a high level flow chart which depicts a client computer system permitting a user to access the client in response to a receipt of a primary password from a server computer system in response to a successful execution of an interrogative password method in accordance with the method and system of the present invention. The process starts as depicted at block 700 and thereafter passes to block 702 which illustrates the client processing initial POST commands. At this point in the process, the client has begun a booting process but has not yet completed the booting process. Next, block 704 depicts the client prompting a user for a primary password. This is the primary password stored in the client as depicted in FIG. 4. Thereafter, block 706 illustrates a determination of whether or not a correct password was entered into the client. If a determination is made that the correct password was entered, the process passes to block 708 which depicts the continuation of POST to complete the boot process.

Referring again to block 706, if a determination is made that the correct password was not entered, the process passes to block 710 which illustrates a determination of whether or not a user has been prompted three times for the entry of the correct password. If a determination is made that the user has not been prompted three times for the entry of the correct password, the process passes back to block 706. Referring again to block 710, if a determination is made that the user has already been prompted three times for the entry of the correct password, the process passes to block 712 which depicts a determination of whether or not the user should be prompted for the interrogative password method. If a determination is made that the user should not be prompted for the interrogative password method, the process terminates as illustrated at block 714.

Referring again to block 712, if a determination is made that the user should be prompted for the interrogative password method, the process passes to block 716 which illustrates the client encrypting a message to the server using the server's public and client's private keys. The message includes the client's identifier and requests the challenge question associated with this client. Next, block 718 depicts the client transmitting the encrypted message to the server. Thereafter, block 720 illustrates the client receiving an encrypted response from the server including the question stored associated with this client. The process then passes to block 722 which depicts the client decrypting the response using the client's private and server's public keys. Block 724, then, illustrates the client displaying the challenge question and prompting for an answer to the question.

The process then passes to block 726 which depicts the client receiving a response to the challenge question, encrypting the response, and transmitting the encrypted response to the server. Next, block 728 illustrates the client receiving and decrypting a response from the server. Thereafter, block 730 depicts a determination of whether or not the response includes the primary password or a notice. If the response from the server includes a notice, the process passes to block 732 which illustrates the client displaying the notice that the answer provided to the challenge question was incorrect. The process then terminates as depicted at block 734. POST places the system in a condition that requires the user to power off then power on prior to receiving another attempt at entering passwords.

Referring again to block 730, if a determination is made that the response from the server includes the primary password, the process passes to block 736 which depicts the client's network adapter sending the primary password to the BIOS. Thereafter, block 738 illustrates the continuation of the POST commands and the completion of the boot process.

While a preferred embodiment has been particularly shown and described, it will be understood by those skilled in the art that various changes in form and detail may be made therein without departing from the spirit and scope of the present invention.

What is claimed is:

1. A method in a data processing system for remotely recovering a client computer system's primary password, the client computer system being coupled to a server computer utilizing a network, the method comprising the steps of:

prior to the client computer system completing a boot process and before an operating system controls the client computer system:

(a) prompting a user to enter a primary password, correct entry of the primary password being required prior to the client computer system being accessible by a user;

(b) transmitting an alert to the server computer in response to an incorrect entry of the primary password;

(c) receiving an interrogative associated with the user of the client computer system, but which is different than the primary password;

(d) prompting the user with the received interrogative;

(e) transmitting the user's response to the interrogative to the server, (f) verifying correct entry of the transmitted response at the server;

(g) transmitting the user's primary password to the client computer system in response to correct entry of the transmitted response; and (h) displaying the user's primary password wherein the recovery of the primary password is completed prior to completing the boot process.

2. The method according to claim 1, further comprising the step of providing said interrogative including a question and correct answer pair.

3. The method according to claim 2, further comprising the step of recovering said primary password from said server computer system in response to a successful completion of said interrogative.

4. The method according to claim 3, further comprising the steps of:

displaying said question included within said interrogative utilizing said client computer system in response to an incorrect entry of said primary password; and prompting a user to enter an answer to said question, wherein an entry of said correct answer will successfully complete said interrogative.

5. The method according to claim 4, further comprising the step of:

establishing a unique client identifier; and storing said question and said correct answer together with said unique client identifier in said server computer system.

6. The method according to claim 5, further comprising the steps of:

transmitting a request for said question utilizing said client computer system in response to an incorrect entry of said primary password, said request including said unique client identifier; and transmitting said question utilizing said server computer system in response to a receipt of said request.

7. The method according to claim 6, further comprising the steps of:

transmitting a proposed answer to said question utilizing said client computer system; and determining whether said proposed answer is said correct answer utilizing said server computer system.

8. The method according to claim 7, further comprising the step of prohibiting access to said client computer system by prohibiting transmission of said primary password in response to said proposed answer being unequal to said correct answer.

9. The method according to claim 8, further comprising the step of completing said boot process in response to said client computer system receiving said primary password from said server computer system.

10. A system for remotely recovering, a client computer system's primary password comprising:

a client computer system that prompts a user to enter a primary password prior to the client computer system completing a boot process and before an operating system controls the client computer system, correct entry of the primary password being required prior to the client computer system being accessible by a user; and, a network device coupled to the client computer system and to a server computer utilizing a network, wherein the network device is capable of:

(a) transmits an alert to the server computer in response to an incorrect entry of the primary password and is capable of receiving an interrogative associated with the user of the client computer system, but which is different than the primary password, (b) prompting the user with the received interrogative;

(c) transmitting the user's response to the interrogative to the server;

(d) receiving the user's primary password in response to a correct transmitted response; and (e) displaying the user's primary password, wherein the recovery of the primary password is completed prior to completing the boot process.

11. The system according to claim 10, wherein the client computer system displays a question included within said interrogative in response to an incorrect entry of said primary password; and prompts a user to enter an answer to said question, wherein an entry of said correct answer will successfully complete said interrogative.

12. The system according to claim 11, wherein the client computer system completes said boot process in response to said client computer system receiving said primary password from said server computer system.

13. An article of manufacture comprising machine-readable medium including program logic embedded therein that causes control circuitry for remotely recovering a client computer system's primary password, the client computer system being coupled to a server computer utilizing a network, to perform the steps of:

prior to the client computer system completing a boot process and before an operating system controls the client computer system:

(a) prompting a user to enter a primary password, correct entry of the primary password being required prior to the client computer system being accessible by a user;

(b) transmitting an alert to the server computer in response to an incorrect entry of the primary password;

(c) receiving an interrogative associated with the user of the client computer system, but which is different than the primary password;

(d) prompting the user with the received interrogative;

(e) transmitting the user's response to the interrogative to the server;

(f) verifying correct entry of the transmitted response at the server;

(g) transmitting the user's primary password to the client computer system in response to correct entry of the transmitted response; and (h) displaying the user's primary password wherein the recovery of the primary password is completed prior to completing the boot process.

14. The article of manufacture of claim 13, further comprising the step of providing said interrogative including a question and correct answer pair.

15. The article of manufacture of claim 14, further comprising the step of recovering said primary password from said server computer system in response to a successful completion of said interrogative.

16. The article of manufacture of claim 15, further comprising the steps of:

displaying said question included within said interrogative utilizing said client computer system in response to an incorrect entry of said primary password; and prompting a user to enter an answer to said question, wherein an entry of said correct answer will successfully complete said interrogative.

17. The article of manufacture of claim 16, further comprising the step of:

establishing a unique client identifier; and storing said question and said correct answer together with said unique client identifier in said server computer system.

18. The article of manufacture of claim 17, further comprising the steps of:

transmitting a request for said question utilizing said client computer system in response to an incorrect entry of said primary password, said request including said unique client identifier; and transmitting said question utilizing said server computer system in response to a receipt of said request.

19. The article of manufacture of claim 18, further comprising the steps of:

transmitting a proposed answer to said question utilizing said client computer system; and determining whether said proposed answer is said correct answer utilizing said server computer system.

20. The article of manufacture of claim 19, further comprising the step of prohibiting access to said client computer system by prohibiting transmission of said primary password in response to said proposed answer being unequal to said correct answer.

21. The article of manufacture of claim 20, further comprising the step of completing said boot process in response to said client computer system receiving said primary password from said server computer system.

* * * * *